US012770610B2

(12) United States Patent
Tang et al.

(10) Patent No.: US 12,770,610 B2
(45) Date of Patent: Oct. 20, 2026

(54) SYSTEMS AND METHODS FOR IMPROVED AUTOMATIC SPEECH RECOGNITION SYSTEMS

(71) Applicant: Comcast Cable Communications, LLC, Philadelphia, PA (US)

(72) Inventors: Raphael Tang, Washington, DC (US); Karun Kumar, Hyattsville, MD (US); Kendra Chalkley, Portland, OR (US); Liming Zhang, Reston, VA (US); Wenyan Li, Arlington, VA (US); Pamela Shapiro, Denver, CO (US); Yajie Mao, Arlington, VA (US); Gefei Yang, Annandale, VA (US); Jun Ho Shin, Gaithersburg, MD (US); Geoffrey Craig Murray, Bethesda, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 488 days.

(21) Appl. No.: 18/066,174

(22) Filed: Dec. 14, 2022

(65) Prior Publication Data

US 2024/0203397 A1 Jun. 20, 2024

(51) Int. Cl.

*G10L 15/01* (2013.01)
*G06F 40/169* (2020.01)
(Continued)

(52) U.S. Cl.

CPC ............ *G10L 15/01* (2013.01); *G06F 40/169* (2020.01); *G10L 15/063* (2013.01); *G10L 15/197* (2013.01); *G10L 15/22* (2013.01)

(58) Field of Classification Search

CPC ..... G10L 15/01; G10L 15/063; G10L 15/197; G10L 15/22; G06F 40/169
See application file for complete search history.

(56) References Cited

U.S. PATENT DOCUMENTS 7,925,505 B2 * 4/2011 Wu ........................ G10L 15/193
704/255
9,905,224 B2 * 2/2018 Nissan .................... G10L 15/19
(Continued)

FOREIGN PATENT DOCUMENTS

GB 2612984 A * 5/2023 ............... G06N 7/01

OTHER PUBLICATIONS

Hazen et al., Recognition confidence scoring and its use in speech understanding systems, Computer Speech and Language, 2002 (Year: 2002).*

(Continued)

*Primary Examiner* — Bhavesh M Mehta
*Assistant Examiner* — Eunice Lee
(74) *Attorney, Agent, or Firm* — BakerHostetler

(57) ABSTRACT

Selection of training utterances may be carried out in a sample-efficient manner, and the selected training utterances may be annotated to provide improved training information to an ASR system. A computing device may receive, from an ASR system, one or more transcript-score pairs, wherein a transcript-score pair comprises a transcription associated with a voice query and at least one score associated with the transcription. The computing device may determine a likelihood of a word error associated with each transcription of the one or more transcript-score pairs. The computing device may determine, based on the likelihood of the word error, an effect on a word-error rate of the ASR system. The computing device may send at least one of the one or more transcript-score pairs with a threshold effect on the word-error rate of the ASR system to be annotated.

21 Claims, 6 Drawing Sheets

(51) Int. Cl.
*G10L 15/06* (2013.01)
*G10L 15/197* (2013.01)
*G10L 15/22* (2006.01)

(56) References Cited

U.S. PATENT DOCUMENTS

| | | | | |
|---|---|---|---|---|
| 11,056,099 | B2 * | 7/2021 | Zhou | G10L 15/063 |
| 12,198,689 | B1 * | 1/2025 | Whitenack | G10L 15/16 |
| 2013/0191129 | A1 * | 7/2013 | Kurata | G10L 15/10 704/254 |
| 2015/0149176 | A1 * | 5/2015 | Giulianelli | G06F 40/30 704/257 |

OTHER PUBLICATIONS

Apone et al., Caption accuracy metrics project, Caption Viewer Survey: Error Ranking of Real-time Captions in Live Television News Programs, Boston, 2010 (Year: 2010).*
Alexei Baevski, Henry Zhou, Abdelrahman Mohamed, and Michael Auli. wav2vec 2.0: A framework for self-supervised learning of speech representations. arXiv:2006.11477, 2020, 19 pages.
Bradley Efron and Robert Tibshirani. Bootstrap methods for standard errors, confidence intervals, and other measures of statistical accuracy. Statistical science, pp. 54-75, 1986.
Chuan Guo, Geoff Pleiss, Yu Sun, and Kilian Q Weinberger. On calibration of modern neural networks. In International Conference on Machine Learning, pp. 1321-1330. PMLR, 2017.
Daniel Povey, Arnab Ghoshal, Gilles Boulianne, Lukas Burget, Ondrej Glembek, Nagendra Goel, Mirko Hannemann, Petr Motlicek, Yanmin Qian, Petr Schwarz, et al. The Kaldi speech recognition toolkit. In ASRU, 2011, 4 pages.
Jannik Kossen, Sebastian Farquhar, Yarin Gal, and Tom Rainforth. Active testing: Sample efficient model evaluation. arXiv:2103.05331, 2021, 20 pages.
Kishore Papineni, Salim Roukos, Todd Ward, and Wei-Jing Zhu. BLEU: a method for automatic evaluation of machine translation. In ACL, 2002, 8 pages.
Rohit Prabhavalkar, Tara N Sainath, Yonghui Wu, Patrick Nguyen, Zhifeng Chen, Chung-Cheng Chiu, and Anjuli Kannan. Minimum Word Error Rate Training for Attention-based Sequence-to-Sequence Models, 2017, 5pgs.
Sebastian Farquhar, Yarin Gal, and Tom Rainforth. On statistical bias in active learning: How and when to fix it. arXiv:2101.11665, 2021, 30 pages.
Vassil Panayotov, Guoguo Chen, Daniel Povey, and Sanjeev Khudanpur. Librispeech: an asr corpus based on public domain audio books. In ICASSP, 2015, 5 pages.

* cited by examiner

300

400

500

SYSTEMS AND METHODS FOR IMPROVED AUTOMATIC SPEECH RECOGNITION SYSTEMS

BACKGROUND

Automatic speech recognition (ASR) systems may receive input queries from users, and the ASR systems may return most likely results based on the input queries. Typically, ASR systems require a large quantity of training data to operate with a desired degree of accuracy and precision. ASR systems may be trained prior to an initial use for user query speech recognition. For example, ASR systems may be trained with a particular set of training data to generate an initial ASR system. ASR systems may also be partially or fully re-trained throughout their life cycles. For example, ASR systems that were previously trained with one set of training data may be re-trained with a new set of training data to update the ASR system for user query speech recognition. However, training ASR systems, both during an initial training and during a re-training, may be expensive from a labor perspective. For example, a group of people may have to listen to new training utterances and manually annotate the new training utterances for use by the ASR systems. Improvements in ASR training and quality assurance methods are needed.

SUMMARY

Systems, methods, and apparatus are described herein for a Sample Efficient Annotation and Evaluation of Automatic Speech Recognition Systems. A system may be provided for improving the efficiency of training ASR systems, both for training ASR systems that are yet to be used in production and to train ASR systems that are in-production. The system may improve ASR training by providing a subset of high-value utterances to be annotated and incorporated into the ASR system's training corpus. By providing a targeted list of high-value training samples, a smaller quantity of training samples may be used to reach a similar result as training an ASR system on a random selection of training samples. Thus, the present disclosure describes a novel system and method for reducing the resource expenditure when updating ASR systems to recognize and transcribe new or different utterances.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

Figure 1:
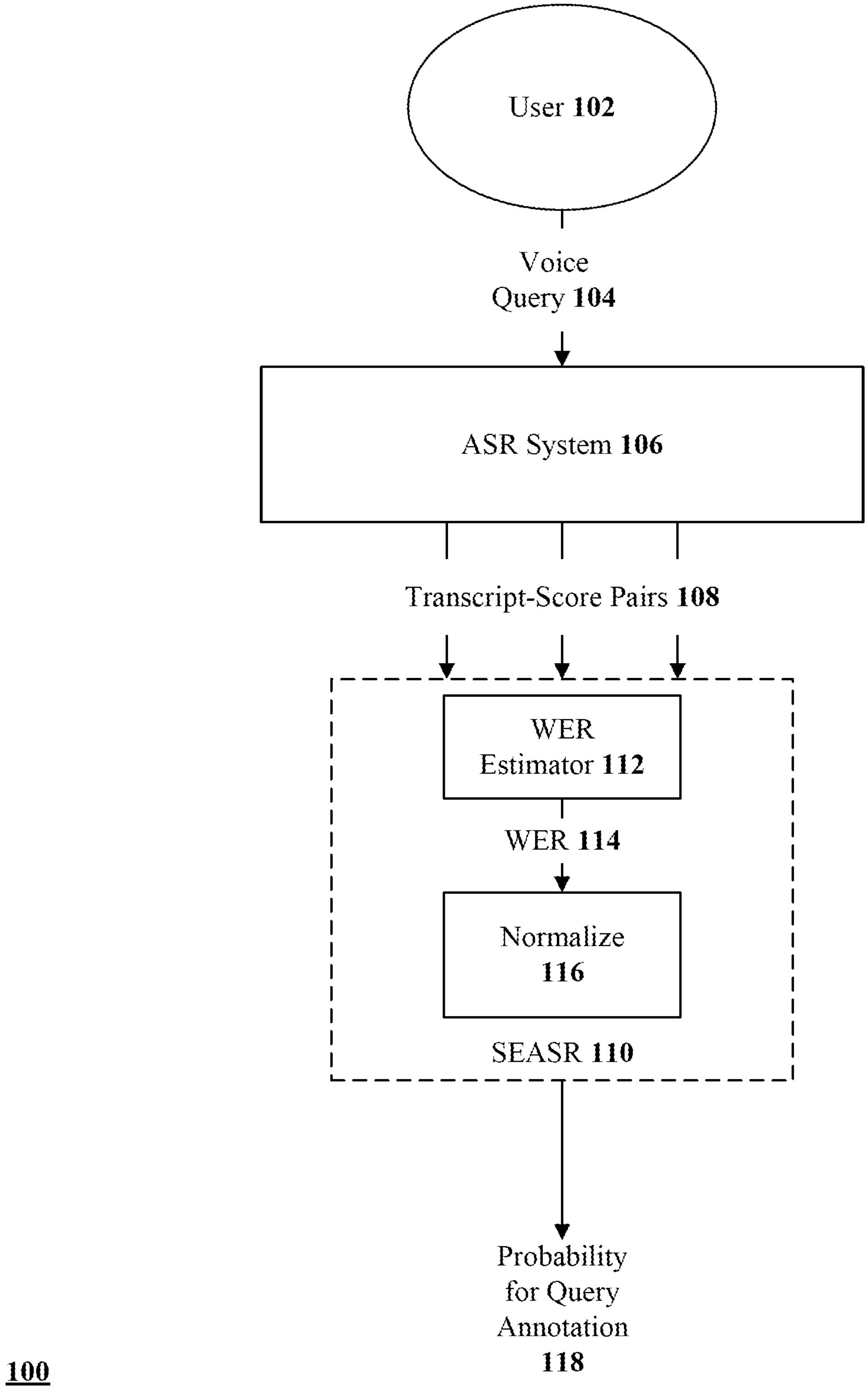
FIG. 1 shows an example system.

Because ASR system training is relatively resource intensive, it is desirable to create a system and method for reducing the labor expenditure required to train such systems. For example, many ASR systems are trained using manually annotated utterances, for example by manually annotating voice queries from a random sample of all voice queries captured by the ASR system or from a training-specific database of voice queries. Therefore, for each utterance used to train the ASR systems, individuals listen to the utterance, decipher the content of the utterance, and annotate the utterance in a way recognizable for the ASR system. Thus, each utterance used in training an ASR system may take multiple times as long as the utterance itself to annotate and prepare.

A diverse and deep pool of training utterances may improve speech detection of an ASR system, thereby reducing the word-error rate (WER) of the ASR system. WER may comprise a measure of a performance of an automatic speech recognition system. In particular, WER may describe a quantity of errors in a given transcription, and WER may describe a statistical measure of a likelihood of an error in a given transcription. However, not every utterance contributes equally to the WER of an ASR system. For example, some common words or phrases may be annotated multiple times across multiple voice queries, and the ASR system may be trained using the multiple different voice queries. An ASR system that is trained on several different utterances of a same word or phrase may be unlikely to mis-transcribe the common word or phrase. Thus, because the common words or phrases are less likely to be mis-transcribed, they may contribute less to an overall WER of the ASR system. In addition, clearly enunciated voice queries may be more easily recognized by an ASR system due to the similarity to previous training samples. On the other hand, ASR systems may only be trained using uncommon voice queries one time or less. Therefore, ASR systems may have a lower effectiveness in recognizing uncommon voice queries, leading to a high WER related to the uncommon voice queries. Likewise, poorly enunciated voice queries may not closely match training samples of the same utterance. Therefore, ASR systems may have a higher WER related to poorly enunciated voice queries.

Accordingly, not all voice queries contribute equally to the WER associated with an ASR system. Providing additional training opportunities to an ASR system with utterances that produce a high WER (e.g., uncommon utterances, poorly enunciated utterances, or the like) can lead to the ASR system more accurately recognizing the utterances, thus lowering a WER associated with the utterances. Therefore, selective sampling of training utterances to emphasize training on utterances that produce a high WER may lead to a similar, or even better WER associated with an ASR system using fewer annotated training utterances.

Furthermore, newly created ASR systems and in-production ASR systems may experience shifts in a distribution of input queries over time, as with nearly all deployed ASR models. The previously used training-time validation set may poorly characterize changes in the distribution of utterances since the previously used training-time validation set may represent utterance distribution shifts in the past, rather than the future. Thus, for quality assurance, practitioners may periodically curate a novel test set of utterances, transcribe the novel test set of utterances, and measure the word-error rate of the system against the novel test set. The process of periodically updating a set of training data to train, or re-train, an ASR system, may incur a high labor cost, with a human transcriber typically taking at least as long as the utterance duration.

To address such an issue, a carefully curated smaller test set that gives greater sample efficiency for an estimand may provide an improvement in resource expenditure, while attaining the same precision of using a larger test set. One prior method uses acquisition functions to choose examples that contribute the most to a loss in accuracy of a model, which has been applied previously in active learning as a form of importance sampling. The prior method describes designing a method for image classification models and calls it "active testing." Active testing may be further improved and generalized to a sequence transduction setting, for example for speech recognition. For example, contributions to the sequence transduction setting may extend active testing to the domain of automatic speech recognition, deriving novel acquisition functions for more efficiently measuring word-error rate (WER). The prior method may explore sample-efficient statistical estimation of the word-error rate for productionized automatic speech recognition system. With the proposed method and system herein, the sample-efficient approach to estimating word-error rate may be achieved in fewer test examples to achieve the same quality as an original sample mean estimator. For example, a sample-efficient approach may produce an estimator that achieves the same quality as the original sample mean estimator using 3× fewer samples, 2× fewer samples, or the like.

As is known in the art, to evaluate supervised models $f{:}X \mapsto Y$ with some objective $L(f(x),y)$, draw a sample $D_{test}$ from the data distribution $p(X,Y)$ and estimate the risk as:

$$\hat{R} := \frac{1}{|D_{test}|}\sum_{i_n \in D_{test}} L\big(f(x_{i_n}),\, y_{i_n}\big)$$

At each iteration, the observed point from $D_{test}$ may be added to the set $$D_{test}^{observed}.$$

In one example, labeling each input x may be costly, preventing the use of the entire test set. A desired outcome is to then reduce the variance of the empirical risk estimator (and hence the empirical risk estimator's mean-squared error) for better sample efficiency.

As is known in the art, one method incorporates the active testing framework to adapt importance sampling-based methods from the active learning literature known in the art, where the points that contribute most to the loss are picked first. In particular, the method uses an acquisition function (proposal distribution) $q(i_n)$, a probability distribution over the indices of the test set, from which the samples may be drawn instead. For a smaller test set of size $M<|D_{test}|$ drawn in such a manner, the resulting risk estimator is:

$$\hat{R}_{LURE} := \frac{1}{M}\sum_{m=1}^{M} v_m L\big(f(x_{i_m}),\, y_{i_m}\big),$$

with a weight $$v_m := 1 + \frac{|D_{test}| - M}{|D_{test}| - m}\left(\frac{1}{(|D_{test}| - m + 1)q(i_m)} - 1\right)$$

Correcting for the bias of the acquisition distribution. A well-known result in the art in importance sampling literature is that the optimal acquisition function (for nonnegative loss) is:

$$q^*(i_m; Y) \propto \mathbb{E}_{y|x_{i_m}} L\big(f(x_{i_m}),\, y\big).$$

The described quantity is the very quantity that is sought after. Thus, as a workaround, the method approximates $p(y|x)$ with a task-specific surrogate function $\pi(y|x,\theta) \approx p(y|x)$, parameterized by $\theta$. In the classification case, where Y is countably finite, an expansion is contemplated over the labels and model:

$$q_{DIRECT}(i_m; Y) \propto \sum_{y \in Y} \pi(y \mid x_{i_m}, \theta) L\big(f(x_{i_m}),\, y\big).$$

Overall, one challenge is to pick an appropriate surrogate function for reducing the variance of the estimator. One known method describes multiple possible surrogate functions, such as the original model, ensembles of networks, and Bayesian neural networks.

In the sequence transduction setting (e.g., speech recognition, machine translation, dialogue generation), Y is a countable infinite set of strings. For many loss functions and evaluation metrics, such as BLEU or WER, the $q_{DIRECT}(i_m; Y)$ is the best such option. However, the summation may be difficult to work with when incorporating an infinite sequence. One possible solution may be to construct a separate Monte Carlo estimator for the $q^*(i_m;Y)$, as:

$$q_{MC}(i_m; Y) \propto \frac{1}{K}\sum_{k=1}^{K} L\big(f(x_{i_m}),\, y_k\big),\; y_k \sim \pi(y_k \mid x_{i_m}, \theta),$$

where K examples are drawn from the surrogate function. A potentially better approximation is to let $Y := Y_N \cup Y_\infty$, with finite $Y_N$ and its infinite complement $Y_\infty$, and construct a direct estimator for $Y_N$ and use $q_{MC}$ for $Y_\infty$:

$$q(i_m; Y) \propto q_{DIRECT}(i_m; Y_N) + q_{MC}(i_m; Y_\infty) \approx q_{DIRECT}(i_m; Y_N).$$

If $Y_N$ covers the true predictive distribution well, then $q_{MC}$ may be dropped altogether. Note that $Y_N$ may depend on $i_m$.

In the automated speech recognition task, the dataset may comprise utterance-transcription pairs, from which the model may learn to transcribe speech utterances to text. Researchers may characterize the model quality using WER, defined as the length-normalized edit distance between the true transcription and the predicted transcription. At inference time, the predictions are decoded from sequential frame-level probability distributions across the alphabet. The decoding process produces, for each utterance $x_{i_n}$, an L-best list of hypotheses $\hat{y}_{i_n} := (y_1, \ldots, y_L)$ with corresponding probabilities $\hat{\phi}_1, \ldots, \hat{\phi}_L$. Such a list should provide appropriate coverage of the true predictive distribution because ASR systems typically have peaky distributions over a handful of transcriptions, naturally yielding the choice $Y_N := \hat{y}_{i_n}$. Note that the top result from the list is the final output of the ASR system, i.e., $f(x_{i_n})$. It remains to choose the form of the surrogate function. Most simply, the model itself may be chosen as the surrogate (i.e., predictive entropy), freeing up the system from having to train another ASR model and incur the associated cost. Unfortunately, the model itself as the surrogate function may underestimate the true loss, and one known method argues against using the model itself as the surrogate function accordingly. However, the known method does not 'soften' the probabilities by rescaling the probabilities, which has been shown to be helpful in well-known uncertainty estimation literature. For each probability $\hat{\phi}_i$, the rescaling may be performed as follows:

$$\hat{\phi}_i := \frac{\hat{\phi}_i^{\tau}}{\sum_{i=1}^{L} \hat{\phi}_i^{\tau}},$$

where $\tau$ is a temperature scaling hyperparameter; when $\tau=1$, the original probability is recovered. To tune $\tau$, a random hyperparameter search may be performed to pick the $\tau$ that results in the smallest estimator error, computed using bootstrapped samples of $$D_{\substack{observed \\ test}}$$

or an existing dev set $D_{dev}$. The final acquisition function may then be described as:

$q_{ASR}(i_m;Y) \partial \Sigma_{y \in \hat{y}i_m} \phi_i WER(f(x_{i_m}),y)$, with the corresponding WER estimator:

$$R_{SEASR} := \frac{1}{M} \sum_{m=1}^{M} c_m WER\left(f\left(x_{i_m}\right), y_{i_m}\right), \text{ where}$$

$$c_m := 1 + \frac{|D_{test}| - M}{|D_{test}| - m}\left(\frac{1}{(|D_{test}| - m + 1) q_{ASR}(i_m)} - 1\right).$$

Note, $i_m$ is drawn from the probability distribution $q_{ASR}(i_m;Y)$ across $D_{test}$. This estimator may be referred to as "sample-efficient annotation in speech recognition," or "SEASR."

In one example, the sample-efficient annotation method may be evaluated with 3000 human-annotated examples across 20 unique voice queries, for example on a Comcast X1 entertainment system. The bootstrapping subsample size may be swept across 1, 2, 4, 8, 16, 32, 64, 96, 128, 192, 256, 384, and 512 samples, or the like, computing the estimator's standard error using, for example, 10,000 resampling iterations each. For the ASR system, a wav2vec 2.0 model known in the art may be fine-tuned on 3,000 hours of Nuance-annotated data across, for example, more than 20,000 unique queries. The 20,000 unique queries may be collected from the Comcast X1 entertainment system as well. At inference time, a beam search size of 20 may be chosen.

Figure 3:
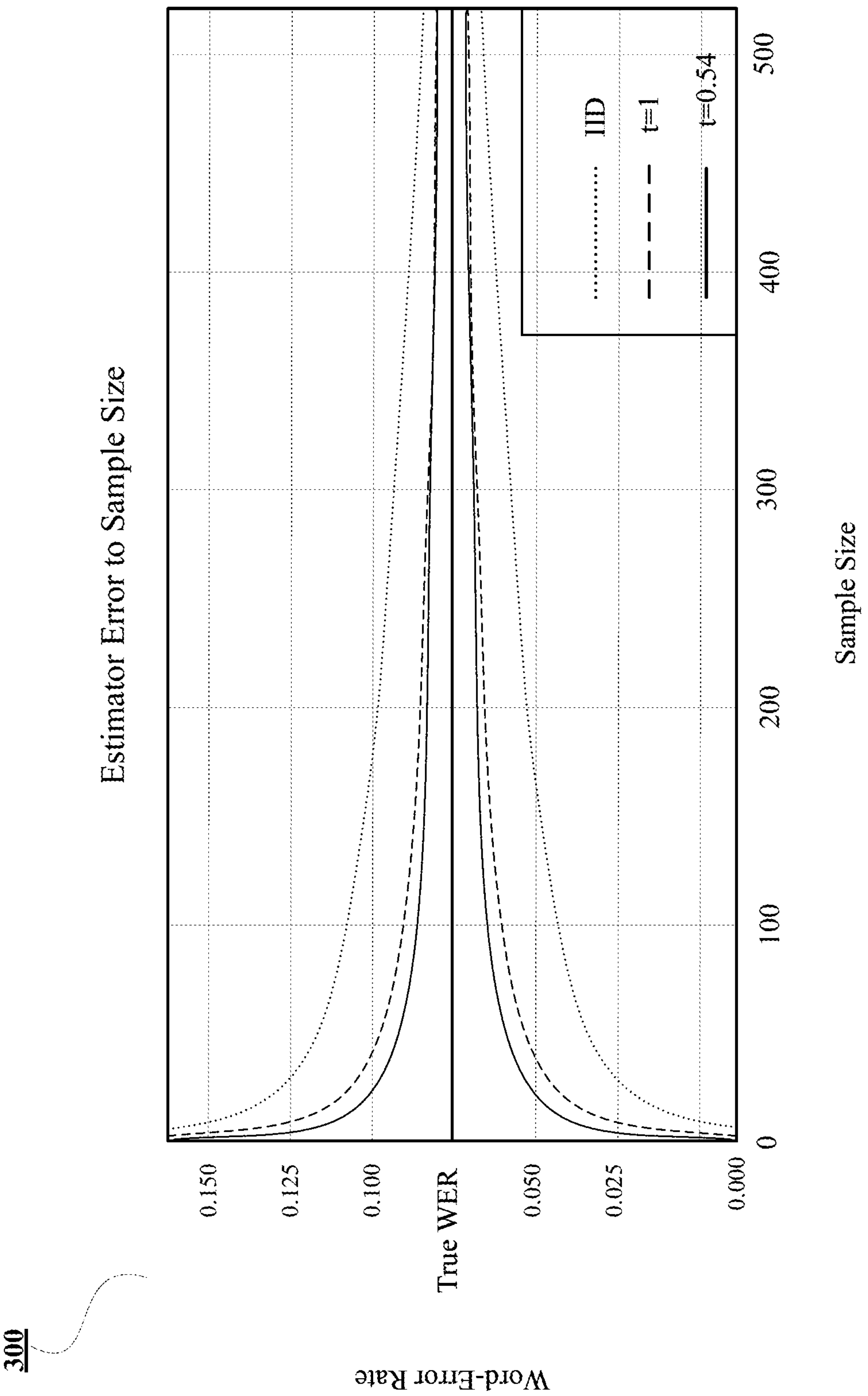
FIG. 3 shows an example method.

To tune $\tau$, a development set from this semi-supervised dataset may be used, rather than the human-annotated test set. $\tau$ may then be swept incrementally. For example, the system may sweep $\tau$ in increments of 0.01 from 0.3 to 3.0, using a subsampling size of, for example 10 with 10,000 iterations of statistical bootstrap for each $\tau$. The $\tau$ with the lowest mean-squared error on the development set may be chosen. The final tuned estimator may be compared against a baseline, for example the original sample mean estimator, as well as the sample-efficient annotation method with a temperature scaling (i.e., $\tau=1$). The results of such an experiment may be seen in FIG. 3. FIG. 3 shows a plot of the word-error rate of the estimator on the human-annotated set against the sample size, along with the standard error of the estimator. In FIG. 3, the optimal estimator is scaled by $\tau=0.54$, though different temperature scaling values may provide better results in different conditions. FIG. 3 shows that both the untuned ($\tau=1$) and the tuned sample-efficient annotation method estimators achieve greater sample efficiency than the traditional sample mean estimator does.

FIG. 1 shows an example system 100 in which the present method and system may be implemented. As shown in FIG. 1, the system 100 may comprise at least one user 102 and the system may optionally comprise at least one user device (not shown) associated with the user 102. For example, the user device may be a computing device described in FIG. 6. The user device may comprise a mobile device, a telephone, a smartphone, a desktop computer, a laptop computer, a portable digital assistant, or the like. The system 100 may be implemented on a user device, for example the system 100 may be implemented in a smartphone. Alternatively, or additionally, the system 100 may be implemented at a remote server (not shown) associated with managing the ASR system. For example, if the system 100 is implemented on a user device, a user 102 may interact with the user device, for example inputting a voice query 104 at the user device, and the system 100 may process the voice query 104 accordingly. Alternatively, the user 102 may input a voice query 104 to the system when the system is not implemented in a user device. For example, the user 102 may input a voice query 104 to a receiver (not shown), and the receiver may pass the voice query 104 to the location where the ASR system 106 is located, such as a remote server. If the ASR system 106 is implemented in a remote location, the user 102, the voice query 104, and the ASR system 106 may be in communication via a network, such as the Internet, an internet service provider (ISP), a local area network (LAN), a Wi-Fi network, a wide area network (WAN), a satellite network, or any combination thereof.

Additionally, the ASR system 106 and the SEASR 110 may be implemented at a same location. For example, the ASR system 106 and the SEASR 110 may both be implemented at a user device, or the ASR system 106 and the SEASR 110 may both be implemented at a remote server. The remote server may be configured to receive voice queries 104 from any number of users 102, and the remote server may be configured to process and return results to a plurality of users 102 in parallel.

The voice query 104 may be sent to the ASR system 106, and the ASR system 106 may take one or more actions to process the voice query 104. For example, the ASR system 106 may attempt to determine a transcription associated with the voice query 104. For example, the ASR system 106 may attempt to determine one or more most likely candidate transcriptions of the voice query 104. The ASR system 106 may determine any number of likely candidate transcriptions of the voice query 104. The ASR system 106 may store, for example in a database associated with the ASR system 106, one or more of the most likely candidate transcriptions of the voice query 104. Additionally, the ASR system 106 may determine a probability associated with each transcription, and the probability may be a measure of the confidence of the ASR system 106 that the transcription is the true transcription of the voice query 104. For example, the ASR system 106 may store, for example in a database associated with the ASR system 106, one of, some of, or all of the probabilities associated with the likely candidate transcriptions. The ASR system 106 may store the one or more most likely candidate transcriptions and the corresponding probabilities in a same or different location, for example a same or different database. Each transcription and its corresponding probability, or score, may be paired as a transcript-score pair 108. For each voice query 104, the ASR system 106 may produce a single transcript-score pair 108, multiple transcript-score pairs 108, or any number of transcript-score pairs 108. Though the term "transcript-score pair" is used throughout, the term "transcript-score pair" is intended to mean any type of association between a transcript and a score associated with the transcript. For example, the ASR system 106 may store a transcription and a score associated with the transcription at a same location or a different location. In each case, the transcription and the score associated with the transcription may be described as a "transcript-score pair."

The ASR system 106 may determine a threshold confidence value, wherein transcript-score pairs 108 with a confidence greater than the threshold confidence value are passed from the ASR system 106 to the SEASR 110. The SEASR 110 may receive any number of transcript-score pairs 108 associated with a single voice query 104. For example, the ASR system 106 may determine only a single transcript-score pair 108 associated with the voice query 104 meets the threshold confidence value, or the ASR system 106 may determine a plurality of transcript-score pairs 108 associated with the voice query 104 meet the threshold confidence value.

The SEASR 110 may comprise an estimator for sample-efficient estimation of a word-error rate of an ASR system. For example, the SEASR 110 may comprise an estimator based on the ASR system 106, and the SEASR 110 may be specifically tuned to provide a sample-efficient estimation of a word-error rate associated with the ASR system 106. The SEASR 110 may be used to selectively determine updated training samples to be annotated, and the annotated training samples may be used by the ASR system 106 to improve the efficiency of predicted transcriptions made by the ASR system 106 over time. For example, if the ASR system 106 is trained to primarily recognize voice queries 104 associated with television shows, new television shows may come out over time, and the ASR system 106 may not have been trained on sufficient training examples to efficiently recognize voice queries 104 associated with the new television show. Therefore, the ASR system 106 may be provided with additional training examples, such as annotated voice queries associated with the new television show, to provide better outcomes by the ASR system 106 when voice queries 104 are related to the new television show. Accordingly, the ASR system 106 may be trained to better recognize the annotated voice queries associated with the new television show, and the ASR system 106 may use the training from the additional training examples to reduce a WER associated with the ASR system 106. The SEASR 110 may be used to curate a specific list of training examples to update the ASR system 106 in an efficient manner.

The SEASR 110 may receive the one or more transcript-score pairs 108 for processing the WER 114 associated with the ASR system 106 and/or the transcript-score pairs 108. The SEASR 110 may comprise a risk estimator, for example a WER estimator 112 to estimate an empirical risk of the ASR system 106. The WER estimator 112 may determine a WER associated with a particular transcript-score pair 108. For example, the WER estimator 112 may compare, for the particular transcript-score pair 108, the transcript-score pair 108 with an annotated version of an utterance associated with the transcript-score pair 108. For example, the annotated version of the utterance may be a manually generated annotated version of the utterance by a human operator. For example, the transcript-score pair 108 may have one or more errors compared to the annotated version of the utterance. The SEASR 110 may also determine a weight, or a normalization, of the transcript-score pair 108 to determine how much a particular transcription of a transcript-score pair 108 contributes to the WER of the ASR system 106. The SEASR 110 may use a surrogate function to determine the WER and the variance of the ASR system 106.

ASR systems are typically designed to receive an input of a voice query 104 and to output one or more likely transcriptions along with a probability associated with each one of the one or more likely transcriptions. Thus, the ASR system 106 itself may be used as the surrogate function. As the ASR system 106 outputs one or more transcript-score pairs 108, the SEASR 110 may use the surrogate function to determine the probability that each of the one or more transcript-score pairs 108 is a true transcription of the voice query 104 associated with the transcript-score pairs 108. In one example, the SEASR 110, using the surrogate function, determines a single transcription that is most likely the true transcription of the voice query 104. In this example, the SEASR 110 may determine every other transcript-score pair 108 is unlikely to be the true transcription of the voice query 104. In this example, the ASR system 106 may have a high confidence in the output transcript-score pairs 108 because a single one of the transcriptions is very likely to be the true transcription of the voice query 104. Such an example shows the ASR system 106 is able to effectively recognize the voice query 104 that led to identification of a single transcription with a high likelihood of the transcription being the true transcription of the voice query 104. Thus, providing the particular voice query 104 as a new training sample for the ASR system 106 may not effectively improve the ASR system's 106 detection and recognition capabilities because the ASR system 106 can already efficiently identify the voice query 104.

In another example, an ASR system 106 may receive a voice query 104, and the ASR system 106 may output a list of several transcript-score pairs 108 that each have a similar, but low probability of being a true transcription of the voice query 104. In the example, the ASR system 106 is unable to clearly identify the true transcription of the voice query 104, and the ASR system 106 returns many possibilities, none of which are highly likely to be the true transcription of the voice query 104. The SEASR 110 may receive each of the several transcript-score pairs 108, and the WER estimator may determine, using the surrogate function, the several, low probability transcriptions. Therefore, due to the low probability of any one of the transcriptions being the true transcription of the voice query 104, a likelihood of a word error is high. Thus, the WER estimator 112 may determine a relatively high WER 114 associated with the voice query 104. In the example, the SEASR 110 may also determine that, due to the many possible true transcriptions of the voice query 104, the ASR system 106 experiences a high variance associated with the voice query 104. The SEASR 110 may determine that the particular voice query 104 may have a high likelihood of contributing to a WER associated with the ASR system 106. Thus, the SEASR 110 may determine, due to the high likelihood of the voice query 104 contributing a significant amount toward the WER of the ASR system 106, to send the voice query 104 to be annotated, for example the voice query may be sent to a human operator to be annotated. Once annotated, the annotated voice query 104 may be provided to the ASR system 106 as a training sample to improve the future WER of the ASR system 106 based on the additional training from the training sample.

According to the two preceding examples, the SEASR 110 may determine that a voice query 104 that has a high enough variance contributes a threshold amount toward the WER of the ASR system 106, and the SEASR 110 sends the voice query 104 to be annotated for use in further training the ASR system 106. On the other hand, the SEASR 110 may determine a voice query 104 has a low variance and contributes relatively little to the WER of the ASR system 106, and the SEASR 110 may determine the voice query 104 should not be annotated for use in further training the ASR system 106.

Based at least in part on determining the WER 114 of a voice query 104 and a normalization 116 of the voice query based on how likely the voice query 104 is to contribute to a WER of the ASR system 106, the SEASR 110 determines a probability the voice query 104 should be annotated 118 and used in future training of the ASR system 106.

Figure 2:
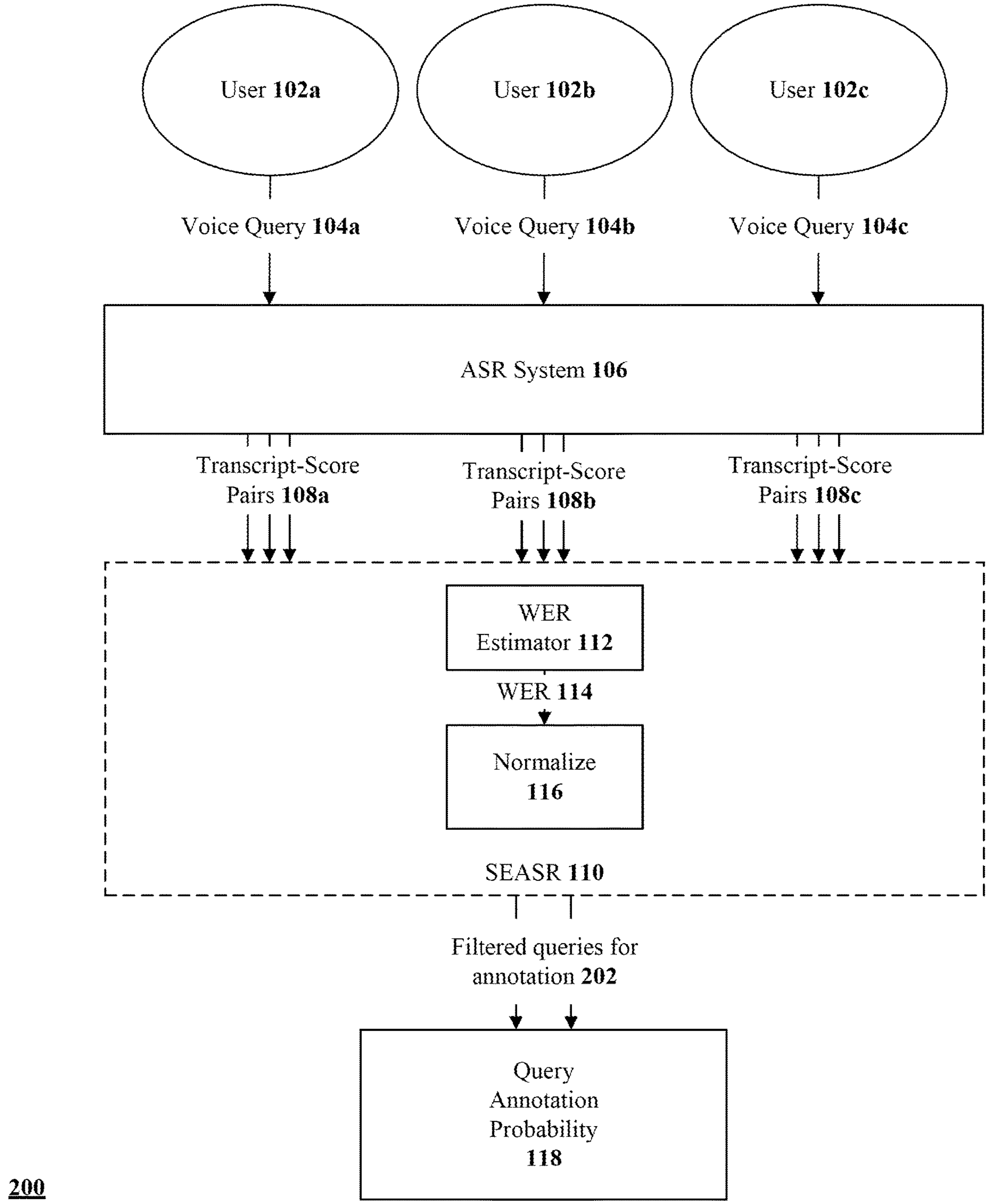
FIG. 2 shows an example system.

FIG. 2 shows an example system 200 in which the present method and system may be implemented. As shown in FIG. 2, the system 200 may comprise a plurality of users 102*a*, 102*b*, and 102*c*, and the system may optionally comprise at least one user device (not shown). The user device may be associated with all of the users 102*a-c*, or the system 200 may comprise a plurality of user devices each associated with individual users 102*a*, 102*b*, and 102*c*. For example, the at least one user device may be a computing device described in FIG. 6. The at least one user device may comprise a mobile device, a telephone, a smartphone, a desktop computer, a laptop computer, a portable digital assistant, or the like. The system 200 may be implemented on at least one user device, for example the system 200 may be implemented in a set top bot (STB). Alternatively, or additionally, the system 200 may be implemented at a remote server (not shown) associated with managing the ASR system 106. For example, if the system 200 is implemented on a user device, a user 102*a* may interact with the user device, for example inputting a voice query 104*a* at the user device, and the system 200 may process the voice query 104*a* accordingly. Additionally, a second user 102*b*, a third user 102*c*, and any other number of users may input additional voice queries (such as voice query 104*b* and 104*c*) at the user device, and the system 200 may process the additional voice queries accordingly. Alternatively, the users 102*a-c* may input voice queries 104*a-c* to the system when the system is not implemented in a user device. For example, the users 102*a* may input a voice query 104*a* at a first receiver (not shown), and the first receiver may pass the voice query 104*a* to the location where the ASR system 106 is located, such as a remote server. Additionally, user 102*b* may input a voice query 104*b* to a second receiver, and the second receiver may pass the voice query 104*b* to the ASR system 106. If the ASR system 106 is implemented in a remote location, the users 102*a-c*, the voice queries 104*a-c*, and the ASR system 106 may be in communication via a network, such as the Internet, an internet service provider (ISP), a local area network (LAN), a Wi-Fi network, a wide area network (WAN), a satellite network, or any combination thereof.

Additionally, the ASR system 106 and the SEASR 110 may be implemented at a same location. For example, the ASR system 106 and the SEASR 110 may both be implemented at a user device, or the ASR system 106 and the SEASR 110 may both be implemented at a remote server. The remote server may be configured to receive voice queries 104*a-c* from any number of users 102*a-c*, and the remote server may be configured to process and return results to a plurality of users 102*a-c* in parallel. Furthermore, the ASR system 106 and the SEASR 110 may be implemented in different devices or locations. For example, the ASR system 106 may be implemented at a user device or at a first remote location, while the SEASR 110 may be implemented at a second remote location.

The voice queries 104*a-c* may be sent to the ASR system 106, and the ASR system 106 may take one or more actions to process the voice queries 104*a-c*. For example, the ASR system 106 may attempt to determine a transcription associated with each one of the voice queries 104*a-c*. For example, the ASR system 106 may attempt to determine one or more most likely candidate transcriptions of the voice query 104*a*. Additionally, the ASR system 106 may determine a probability associated with each transcription, and the probability may be a measure of the confidence of the ASR system 106 that the transcription is the true transcription of the voice query 104*a*. Each transcription and its corresponding probability, or score, may be paired as a transcript-score pair 108*a*. For each voice query 104*a-c*, the ASR system 106 may produce a single transcript-score pair 108*a-c*, multiple transcript-score pairs 108*a-c*, or any number of transcript-score pairs 108*a-c*. The ASR system 106 may process multiple voice queries 104*a-c* from multiple users 102*a-c* in series, in parallel, simultaneously, or the like.

The ASR system 106 may determine a threshold confidence value, wherein transcript-score pairs, for example transcript-score pairs 108*a* with a confidence greater than the threshold confidence value are passed from the ASR system 106 to the SEASR 110. The SEASR 110 may receive any number of transcript-score pairs 108*a* associated with a single voice query 104*a*. For example, the ASR system 106 may determine only a single transcript-score pair 108*a* associated with the voice query 104*a* meets the threshold confidence value, or the ASR system 106 may determine a plurality of transcript-score pairs 108*a* associated with the voice query 104 meet the threshold confidence value.

The SEASR 110 may comprise an estimator for sample-efficient estimation of a word-error rate of an ASR system 106. For example, the SEASR 110 may comprise an estimator based on the ASR system 106, and the SEASR 110 may be specifically tuned to provide a sample-efficient estimation of a word-error rate associated with the ASR system 106. The SEASR 110 may be used to selectively determine updated training samples to be annotated, and the annotated training samples may be used by the ASR system 106 to improve the efficiency of predicted transcriptions made by the ASR system 106 over time. For example, if the ASR system 106 is trained to primarily recognize voice queries associated with television shows, new television shows may come out over time, and the ASR system 106 may not have been trained on sufficient training examples to efficiently recognize voice queries associated with the new television show. Therefore, the ASR system 106 may be provided with additional training examples, such as annotated voice queries associated with the new television show, to provide better outcomes by the ASR system 106 when voice queries are related to the new television show. The SEASR 110 may be used to curate a specific list of training examples to update the ASR system 106 in an efficient manner. For example, the SEASR 110 may analyze a plurality of voice queries, such as voice query 104*a*, voice query 104*b*, and voice query 104*c*, and the SEASR 110 may determine a filtered subset of the voice queries 202 with a threshold query annotation probability 118 to send for annotation.

The SEASR 110 may receive the one or more transcript-score pairs 108*a* for processing the WER 114 associated with the ASR system 106 and/or the voice query 104*a*. The SEASR 110 may comprise a risk estimator, for example a WER estimator 112 to estimate an empirical risk of the ASR system 106. The WER estimator 112 may determine a WER associated with a particular voice query 104*a*. The SEASR 110 may also determine a weight, or a normalization, of the voice query 104*a* to determine how much a particular transcription of a voice query 104*a* contributes to the WER of the ASR system 106.

The SEASR 110 may use a surrogate function to determine the WER and the variance of the ASR system 106 in view of the voice queries 104*a-c*. For example, ASR systems are typically designed to receive an input of a voice query, for example voice queries 104*a-c*, and to output one or more likely transcriptions along with a probability associated with each one of the one or more likely transcriptions. Thus, the ASR system 106 itself may be used as the surrogate function. As the ASR system 106 outputs one or more groups of transcript-score pairs 108*a-c*, the SEASR 110 may use the surrogate function to determine the probability that each of the one or more transcript-score pairs 108*a-c* is a true transcription of the voice queries 104*a-c* associated with each of the groups of the transcript-score pairs 108*a-c*. In one example, the SEASR 110, using the surrogate function, determines a single transcription from transcript-score pair 108*a* that is most likely the true transcription of the voice query 104*a*. In this example, the SEASR 110 may determine every other transcript-score pair 108*a* is unlikely to be the true transcription of the voice query 104*a*. In this example, the ASR system 106 may have a high confidence in the output transcript-score pairs 108*a* because a single one of the transcriptions is very likely to be the true transcription of the voice query 104*a*. Such an example shows the ASR system 106 is able to effectively recognize the voice query 104*a* that led to identification of a single transcription with a high likelihood of the transcription being the true transcription of the voice query 104*a*. Thus, providing the particular voice query 104*a* as a new training sample for the ASR system 106 may not effectively improve the ASR system's 106 detection and recognition capabilities because the ASR system 106 can already efficiently identify the voice query 104*a*.

In another example, an ASR system 106 may receive a voice query 104*b*, and the ASR system 106 may output a list of several transcript-score pairs 108*b* that each have a similar, but low probability of being a true transcription of the voice query 104*b*. In the example, the ASR system 106 is unable to clearly identify the true transcription of the voice query 104*b*, and the ASR system 106 returns many possibilities, none of which are highly likely to be the true transcription of the voice query 104*b*. The SEASR 110 may receive each of the several transcript-score pairs 108*b*, and the WER estimator may determine, using the surrogate function, the several, low probability transcriptions. Therefore, due to the low probability of any one of the transcriptions being the true transcription of the voice query 104*b*, a likelihood of a word error is high. Thus, the WER estimator 112 may determine a relatively high WER 114 associated with the voice query 104*b*. In the example, the SEASR 110 may also determine that, due to the many possible true transcriptions of the voice query 104*b*, the ASR system 106 experiences a high variance associated with the voice query 104*b*. The SEASR 110 may determine that the particular voice query 104*b* may have a high likelihood of contributing to a WER associated with the ASR system 106. Thus, the SEASR 110 may determine, due to the high likelihood of the voice query 104*b* contributing a significant amount toward the WER of the ASR system 106, to send the voice query 104*b* to be annotated. Once annotated, the annotated voice query 104*b* may be provided to the ASR system 106 as a training sample to improve the future WER of the ASR system 106 based on the additional training from the training sample.

According to the two preceding examples, the SEASR 110 may determine that a voice query 104*b* with a high level of variance contributes a threshold amount toward the WER of the ASR system 106, and the SEASR 110 sends the voice query 104*b* to be annotated for use in further training the ASR system 106. On the other hand, the SEASR 110 may determine a voice query 104*a* has a low variance and contributes relatively little to the WER of the ASR system 106, and the SEASR 110 may determine the voice query 104*a* should not be annotated for use in further training the ASR system 106.

Based at least in part on determining the WER 114 of a voice query 104*a-c* and a normalization 116 of the voice query 104*a-c* based on how likely the voice query 104*a-c* is to contribute to a WER of the ASR system 106, the SEASR 110 determines a probability the voice query 104*a-c* should be annotated 118 and used in future training of the ASR system 106. Therefore, the SEASR 110 acts as a filter, only allowing a filtered subset of voice queries 202 with a sufficiently high variance to pass through to be annotated 118.

FIG. 3 shows an example result of an evaluation of a SEASR in different scenarios and using different quantities of training samples, compared to a typical training sample set. For example, FIG. 3 shows three different WER estimators when computing the three WER estimator's observed WER across different quantities of training samples. One example shows a baseline estimator error size using an original sample mean estimator. The other two examples show the baseline estimator error using an untuned and a tuned version of the SEASR 110. In general, as the sample size increases, the estimator error decreases, converging toward the true WER of the system.

Figure 4:
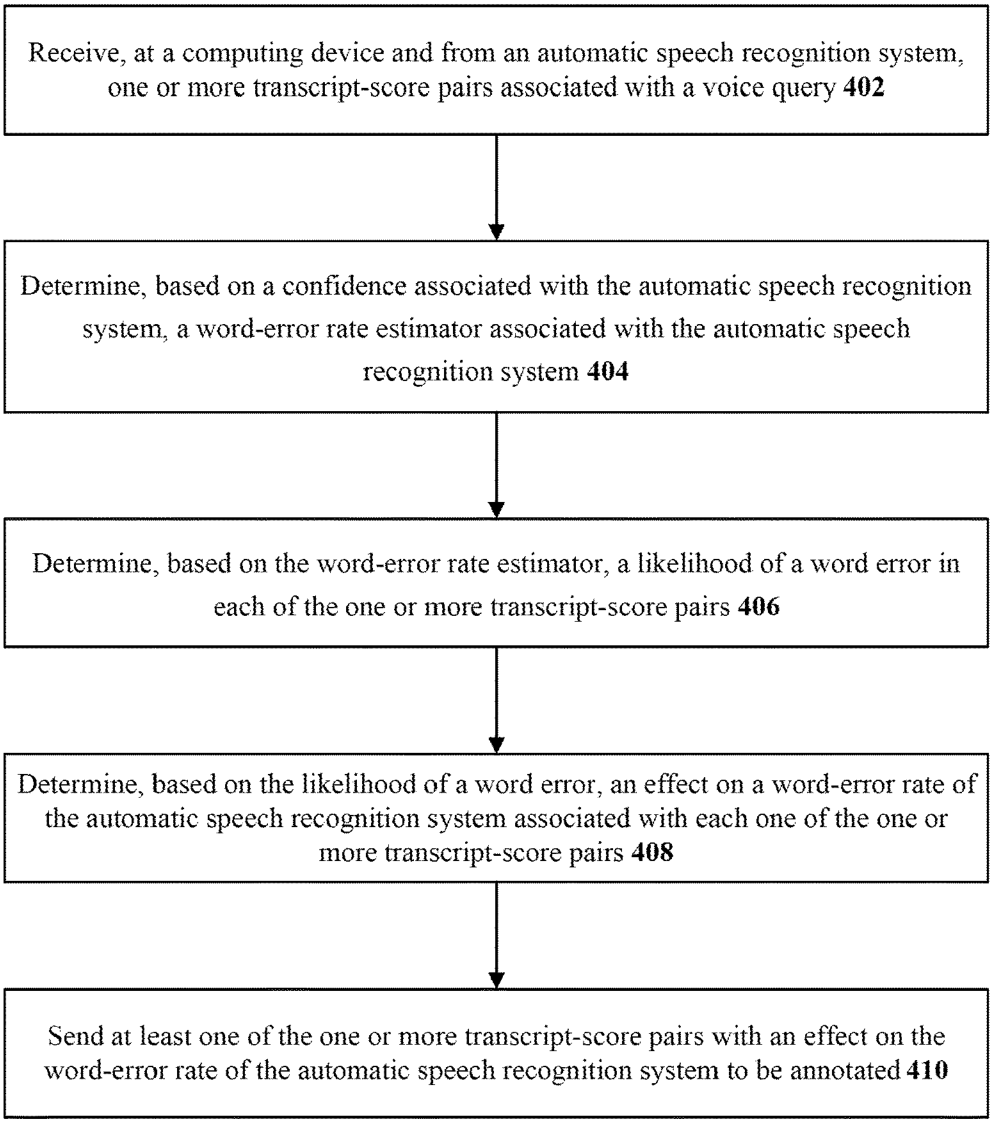
FIG. 4 shows an example method.

FIG. 4 shows an example method. The method of FIG. 4 may be used in a system for ASR and training such ASR systems. For example, the method of FIG. 4 may be implemented by either, or both, of FIGS. 1 and 2. The method of FIG. 4 may take place completely at a user device. The method of FIG. 4 may take place partially at a user device. The method of FIG. 4 may take place partially at a remote or central server location. The method of FIG. 4 may take place at a single remote server, or pieces of the method of FIG. 4 may take place at different remote servers.

At step 402, a computing device, such as a user device or a server device, receives, from an ASR system, one or more transcript-score pairs associated with a voice query. The one or more transcript-score pairs may be associated with a plurality of voice queries. Each one of the one or more transcript-score pairs may comprise a predicted transcription of a voice query and a confidence that the predicted transcription is a true transcription of the voice query. The transcription may be a word, a phrase, or any series of letters and words.

At step 404, the computing device may determine, based on a confidence associated with the ASR system, a WER estimator associated with the overall ASR system. The confidence associated with the ASR system may describe a likelihood that the ASR system correctly transcribes any individual voice query, regardless of the voice query. The WER estimator may comprise a surrogate function, and the surrogate function may comprise the ASR system. The WER estimator may be scaled. The scaling may be according to a temperature hyperparameter. The WER estimator may estimate a WER of a transcription of a transcript-score pair of the voice query.

At step 406, the computing device may determine, based on the WER estimator, a likelihood of a word error in each of the one or more transcript-score pairs. The computing device may determine, based on the WER estimator, a likelihood of a word error in the voice query. The WER estimator may determine a likelihood of a word error in each transcription of the one or more transcript-score pairs.

At step 408, the computing device may determine, based on the likelihood of a word error, an effect on a WER of the ASR system associated with each one of the one or more transcript-score pairs. The computing device may determine an effect on a WER of the ASR system associated with the voice query. For example, the computing device may determine an overall WER of the ASR system based on a particular voice query. The computing device may determine how significant the particular likelihood of the word error is by determining a variance associated with the transcript-score pairs of the voice query. For example, the estimator may determine a low variance, for example when a transcription of only one transcript-score pair has a high probability of being the true transcription of the voice query. Alternatively, the estimator may determine the output of the ASR system associated with the voice query has a high variance. For example, the estimator may determine the output of the ASR system comprises several transcriptions with a low probability of being the true transcription of the voice query. In the example, the high variance indicates a relatively large effect of the voice query on the WER of the ASR system. Accordingly, the estimator may determine the ASR system may derive a relatively large accuracy increase by incorporating the voice query into a set of training samples of the ASR system.

At step 410, the computing device sends at least one of the one or more transcript-score pairs with an effect on the word-error rate of the ASR system to be annotated. For example, the computing device may determine one or more transcript-score pairs with a greatest effect on the WER of the ASR system, and the computing device may send the one or more transcript-score pairs with the greatest effect on the WER of the ASR system to be annotated. For example, the computing device may determine one or more transcript-score pairs with at least a threshold effect on the WER of the ASR system, and the computing device may send the one or more transcript-score pairs with at least the threshold effect one the WER of the ASR system to be annotated. For example, the computing device may, using the estimator, determine one voice query with a highest variance among the one or more voice queries. The computing device may determine the variance associated with the one voice query of the one or more voice queries is sufficiently large. The computing device may determine the voice query should be annotated for use as a training sample in the ASR system. The annotation may be done by a human annotator. The annotated training sample may be provided to the ASR system to update the ASR system's training corpus and improve an accuracy of the ASR system to recognize voice queries of a certain type.

Figure 5:
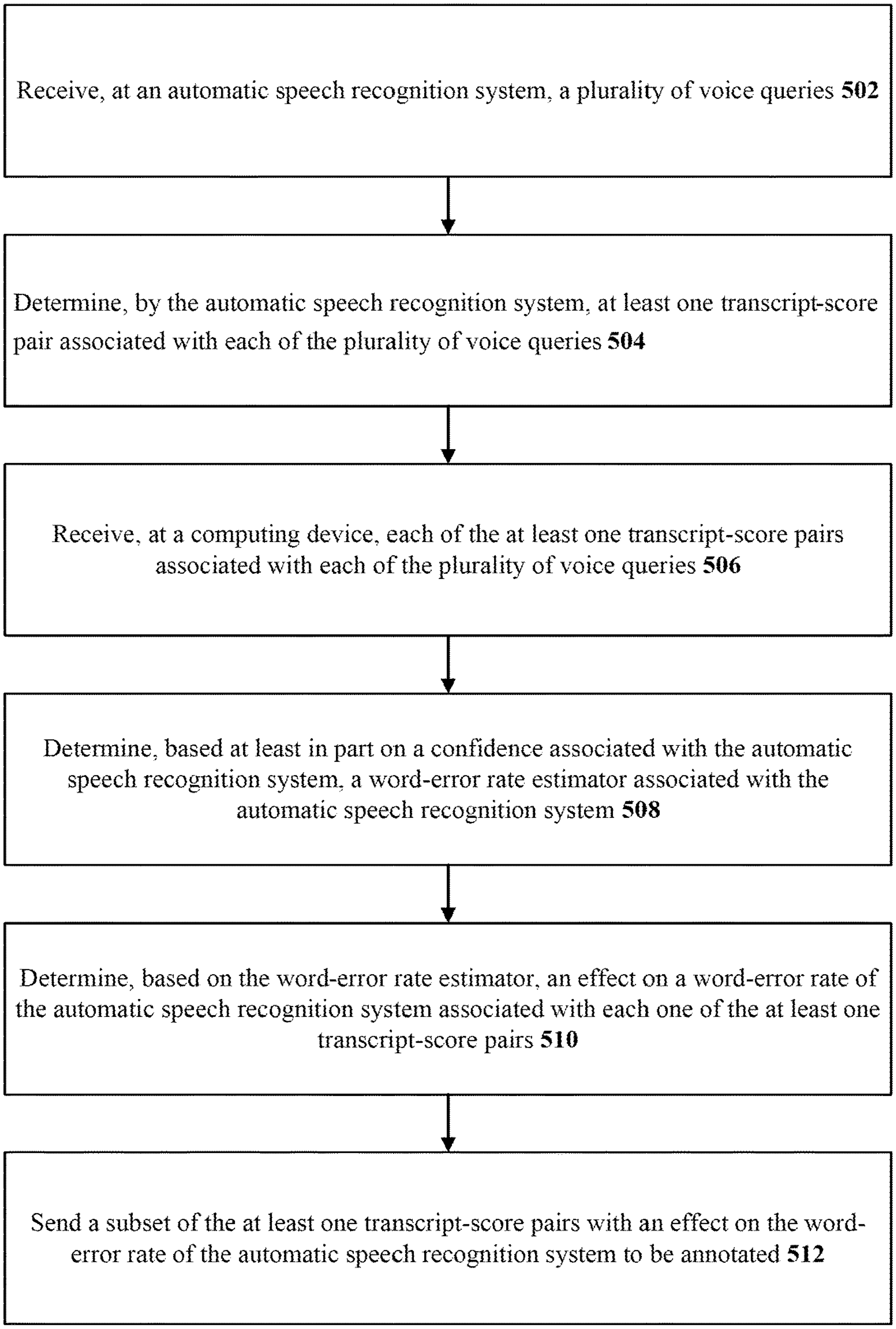
FIG. 5 shows an example method.

FIG. 5 shows an example method. The method of FIG. 5 may be used in a system for ASR and for training ASR systems. For example, the method of FIG. 5 may be implemented by either, or both, of FIGS. 1 and 2. The method of FIG. 5 may take place completely at a user device. The method of FIG. 5 may take place partially at a user device. The method of FIG. 5 may take place partially at a remote or central server location. The method of FIG. 5 may take place at a single remote server, or different steps of the method of FIG. 5 may take place at different remote servers in series, in parallel, or simultaneously.

At step 502, an ASR system receives a plurality of voice queries. The voice queries may be received from a single user, or the plurality of voice queries may be received from a plurality of users. The voice queries may be received substantially simultaneously, or the voice queries may be received over a period of time. The voice queries may each be unique voice queries, or the voice queries may all be related to the same query but produced by different users.

At step 504, the ASR system may determine at least one transcript-score pair associated with each of the plurality of voice queries. Each voice query of the plurality of voice queries may be associated with a single transcript-score pair, or each voice query of the plurality of voice queries may be associated with a plurality of transcript-score pairs, or any suitable combination. Each one of the at least one transcript-score pairs may comprise a predicted transcription associated with a voice query, as well as a confidence score associated with a likelihood that the predicted transcription is the same as a true transcription of the associated voice query. The ASR system may output a subset of all possible transcript-score pairs by outputting each transcript-score pair with a threshold confidence score. The ASR system may send the transcript-score pairs to a computing device to calculate the WER of the ASR system and to determine further training samples.

At step 506, the computing device may receive each one of the at least one transcript-score pairs associated with each of the plurality of voice queries. Each one of the transcript-score pairs may be received substantially simultaneously, or the transcript-score pairs may be received over a period of time. The computing device may process the transcript-score pairs as each one is received from the ASR system, or the computing device may group a plurality of transcript-score pairs and process the plurality of transcript-score pairs together.

At step 508, the computing device may determine a WER estimator associated with the ASR system. The WER estimator may be based at least in part on the ASR system itself, and the WER estimator may be based at least in part on a confidence associated with an output of the ASR system. For example, the WER estimator may be based at least in part on a confidence score determined by the ASR system associated with a transcript-score pair. The computing device may determine, based at least in part on the confidence associated with the ASR system, the WER estimator, and the WER estimator may be configured to determine a WER associated with the overall ASR system. Additionally, or alternatively, the WER estimator may be configured to determine a WER associated with an individual voice query of the plurality of voice queries.

At step 510, the computing device determines, based on the WER estimator, an effect on a WER of the ASR system associated each one of the at least one transcript-score pair. The computing device may determine an effect on a WER of the ASR system associated with the voice query. For example, the computing device may determine an overall WER of the ASR system based on a particular voice query of the plurality of voice queries. The computing device may determine a significance of a particular WER of the voice query by determining a variance associated with the transcript-score pairs of the particular voice query. The computing device may determine a low variance associated with a particular voice query, for example when a transcription of one of the transcript-score pairs associated with the particular voice query has a significantly higher confidence score than any other transcript-score pairs associated with the particular voice query. In this example, the high probability of a single transcript-score pair representing a true transcription of the voice query reduces the variance determined by the computing device, and the computing device may determine the particular voice query has a small effect on an overall WER of the ASR system. Alternatively, the computing device may determine a high variance associated with a different voice query, for example when multiple transcriptions of the transcript-score pairs associated with the different voice query have a similar, low confidence score. In this example, the relatively low confidence scores, and the relatively similar confidence scores across multiple transcript-score pairs, reduces the likelihood that the ASR is effectively determining the true transcription of the different voice query. Thus, the different voice query may contribute a relatively large amount to the WER of the ASR system due to the lack of confidence in determining a correct transcription of the different voice query. The computing device may determine a voice query associated with a high variance and/or a high WER should be annotated and used as training samples for the ASR system.

At step 512, the computing device sends a subset of the at least one transcript-score pairs with a greatest effect on the WER of the ASR system to be annotated. The computing device may determine a single voice query of the plurality of voice queries that contributes the most WER to the overall ASR system. Alternatively, the computing device may send a plurality of voice queries to be annotated. The computing device may send all voice queries with a threshold effect on the WER of the ASR system to be annotated. The annotation may be carried out by a human annotator. The annotated training sample may be provided to the ASR system to update the ASR system's training corpus and improve an accuracy of the ASR system to recognize voice queries of a certain type.

Figure 6:
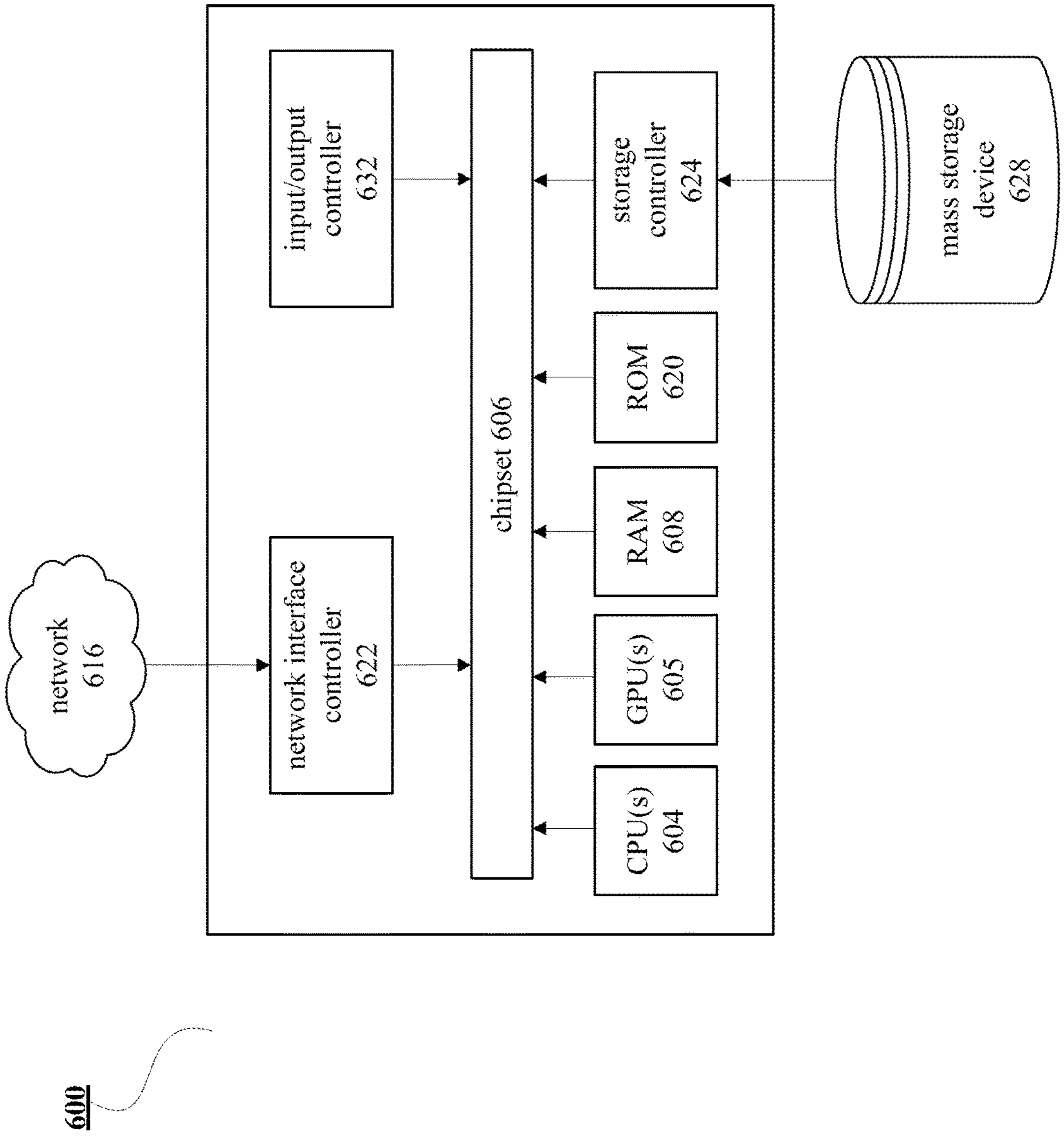
FIG. 6 shows an example computing system.

FIG. 6 shows an example computing device 600 that may represent any of the various devices or entities shown in FIG. 1, including, for example, the ASR System 106, the SEASR 110, or a database. That is, the computing device 600 shown in FIG. 6 may comprise any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIGS. 1 and 2 or any of the methods described in relation to FIGS. 3-5.

The computing device 600 may comprise a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random-access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the system 100. The chipset 606 may comprise functionality for providing network connectivity through a network interface controller (NIC) 622. A NIC 622 may be capable of connecting the computing device 600 to other computing nodes over the system 100. It should be appreciated that multiple NICs 622 may be present in the computing device 600, connecting the computing device to other types of networks and remote computer systems. The NIC 622 may be configured to implement a wired local area network technology, such as IEEE 802.3 ("Ethernet") or the like. The NIC 622 may also comprise any suitable wireless network interface controller capable of wirelessly connecting and communicating with other devices or computing nodes on the system 100. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 628 is characterized as primary or secondary storage or the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also comprise an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not comprise all of the components shown in FIG. 6, may comprise other components that are not explicitly shown in FIG. 6, or may utilize an architecture completely different than that shown in FIG. 6.

As described herein, a computing device may be a physical computing device, such as the computing device 600 of FIG. 6. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of.". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

The invention claimed is:

1. A method comprising:

receiving, at a computing device and from an automatic speech recognition system, one or more transcript-score pairs, wherein a transcript-score pair comprises a transcription associated with a voice query and at least one score associated with the transcription;

determining a likelihood of a word error associated with each transcription of the one or more transcript-score pairs, wherein determining the likelihood of the word error comprises determining a difference between a transcription and a true annotation associated with the voice query;

determining, based on the likelihood of the word error, an effect on a word-error rate of the automatic speech recognition system associated with each one of the one or more transcript-score pairs; and sending at least one of the one or more transcript-score pairs with a threshold effect on increasing the word-error rate of the automatic speech recognition system to be annotated.

2. The method of claim 1, further comprising determining, based on a confidence associated with the automatic speech recognition system, a word-error rate estimator associated with the automatic speech recognition system.

3. The method of claim 1, wherein the likelihood of the word error comprises a likelihood of the automatic speech recognition system producing an incorrect transcription of the voice query, and wherein the effect on the word-error rate of the automatic speech recognition system comprises a proportion of an overall word-error rate of the automatic speech recognition caused by the likelihood of the word error.

4. The method of claim 1, further comprising determining a probability of a correct transcription of each one of the one or more transcript-score pairs associated with the voice query.

5. The method of claim 4, wherein the determining the probability associated with each one of the one or more transcript-score pairs further comprises a scaling factor, wherein the scaling factor is a temperature hyperparameter.

6. The method of claim 1, wherein each one of the one or more transcript-score pairs comprises a determined transcription associated with the voice query and a confidence score associated with a likelihood the determined transcription matches the voice query.

7. The method of claim 1, further comprising updating, based on the sending the at least one of the one or more transcript-score pairs to be annotated, the automatic speech recognition system.

8. The method of claim 7, wherein updating the automatic speech recognition system further comprises training, based on the at least one of the one or more transcript-score pairs, the automatic speech recognition system.

9. A method comprising:

receiving, at an automatic speech recognition system, a plurality of voice queries;

determining, by the automatic speech recognition system, at least one transcript-score pair associated with each of the plurality of voice queries, wherein a transcript-score pair comprises a transcription associated with a voice query of the plurality of voice queries and at least one score associated with the transcription;

receiving, at a computing device, each of the at least one transcript-score pairs associated with each of the plurality of voice queries;

determining an effect on a word-error rate of the automatic speech recognition system associated with each one of the at least one transcript-score pairs; and sending a subset of the at least one transcript-score pairs with a threshold effect on increasing the word-error rate of the automatic speech recognition system to be annotated.

10. The method of claim 9, wherein the effect on the word-error rate of the automatic speech recognition system comprises a proportion of an overall word-error rate of the automatic speech recognition caused by the subset of the at least one transcript-score pairs.

11. The method of claim 9, further comprising determining a probability of a correct transcription of each one of the one or more transcript-score pairs associated with the voice query.

12. The method of claim 11, wherein the determining the probability associated with each one of the one or more transcript-score pairs further comprises a scaling factor, wherein the scaling factor is a temperature hyperparameter.

13. The method of claim 9, wherein each one of the one or more transcript-score pairs comprise a determined transcription associated with the voice query and a confidence score associated with a likelihood the determined transcription matches the voice query.

14. The method of claim 9, further comprising updating, based on the sending the subset of the at least one transcript-score pairs to be annotated, the automatic speech recognition system.

15. The method of claim 14, wherein updating the automatic speech recognition system further comprises training, based on the at least one of the one or more transcript-score pairs, the automatic speech recognition system.

16. A system comprising:

an automatic speech recognition system configured to:

receive a voice query; and send, to a computing device, at least one transcript-score pair associated with the voice query, wherein the at least one transcript-score pair comprises a transcription associated with the voice query and at least one score associated with the transcription; and the computing device configured to:

receive each of the at least one transcript-score pairs associated with the voice query;

determine an effect on a word-error rate of the automatic speech recognition system associated with each one of the at least one transcript-score pairs; and send one or more of the at least one transcript-score pairs with a threshold effect on increasing the word-error rate of the automatic speech recognition system to be annotated.

17. The system of claim 16, wherein the effect on the word-error rate of the automatic speech recognition system comprises a proportion of an overall word-error rate of the automatic speech recognition caused by the one or more of the at least one transcript-score pairs with the threshold effect on the word-error rate.

18. The system of claim 16, further comprising determining a probability of a correct transcription of each one of the one or more transcript-score pairs associated with the voice query.

19. The system of claim 18, wherein the determining the probability associated with each one of the one or more transcript-score pairs further comprises a scaling factor, wherein the scaling factor is a temperature hyperparameter.

20. The system of claim 16, wherein each one of the one or more transcript-score pairs comprise a determined transcription associated with the voice query and a confidence score associated with a likelihood the determined transcription matches the voice query.

21. The system of claim 16, further comprising training, based on the sending the one or more of the at least one transcript-score pairs to be annotated, the automatic speech recognition system.

* * * * *